(12) United States Patent
Kim et al.

(10) Patent No.: US 8,768,149 B2
(45) Date of Patent: Jul. 1, 2014

(54) USER INTERFACE PROVISION METHOD AND A SYSTEM USING THE METHOD

(75) Inventors: Namyoung Kim, Seoul (KR); Kangsoo Seo, Seoul (KR); Jeonghwan Hwang, Seoul (KR); Beomjin Jeon, Seoul (KR); Byungjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/696,905

(22) PCT Filed: May 31, 2011

(86) PCT No.: PCT/KR2011/003966
§ 371 (c)(1),
(2), (4) Date: Nov. 8, 2012

(87) PCT Pub. No.: WO2011/152644
PCT Pub. Date: Dec. 8, 2011

(65) Prior Publication Data
US 2013/0058631 A1  Mar. 7, 2013

(30) Foreign Application Priority Data
Jun. 1, 2010  (KR) .................. 10-2010-0051820

(51) Int. Cl.
*H04N 5/84* (2006.01)
*H04N 5/89* (2006.01)
*H04N 5/92* (2006.01)
*H04N 5/93* (2006.01)
*G11B 27/00* (2006.01)
*G06F 7/00* (2006.01)
*G06F 17/00* (2006.01)
*G06F 17/30* (2006.01)

(52) U.S. Cl.
USPC ........... 386/333; 386/326; 386/353; 386/278; 386/280; 386/282; 386/283; 707/634; 707/805

(58) Field of Classification Search
USPC ......... 386/333, 326, 353, 278, 280, 282, 283; 707/634, 805, 999.102
See application file for complete search history.

(56) References Cited

U.S. PATENT DOCUMENTS

| | | |
|---|---|---|
| 6,456,334 B1 | 9/2002 | Duhault |
| 6,857,128 B1 | 2/2005 | Borden, IV et al. |
| 2002/0166122 A1 | 11/2002 | Kikinis et al. |
| 2003/0023742 A1 | 1/2003 | Allen et al. |

(Continued)

FOREIGN PATENT DOCUMENTS

| | | |
|---|---|---|
| KR | 10-2007-0121000 A | 12/2007 |
| KR | 10-2010-0052203 A | 5/2010 |

OTHER PUBLICATIONS

Written Opinion of the International Search Authority dated Jan. 18, 2012 issued in Application No. PCT/KR2011/003966 (with English Translation).

(Continued)

*Primary Examiner* — Daquan Zhao
(74) *Attorney, Agent, or Firm* — KED & Associates LLP

(57) ABSTRACT

The present invention relates to a user interface provision method and to a system using the method, and more specifically relates to: a user interface provision method in which video signals provided from a plurality of content providers are generated in a browsing interface and supplied to a display device; and a system using the method.

15 Claims, 14 Drawing Sheets

(56) References Cited

U.S. PATENT DOCUMENTS

| | | |
|---|---|---|
| 2006/0026318 A1* | 2/2006 | Lee .................................. 710/72 |
| 2006/0120624 A1 | 6/2006 | Jojic et al. |
| 2007/0204238 A1 | 8/2007 | Hua et al. |
| 2007/0250896 A1 | 10/2007 | Parker et al. |
| 2008/0301731 A1* | 12/2008 | Yamanaka et al. .............. 725/39 |
| 2009/0175355 A1* | 7/2009 | Gordon et al. ........... 375/240.25 |
| 2010/0194998 A1* | 8/2010 | Lee et al. ...................... 348/726 |
| 2010/0251284 A1* | 9/2010 | Ellis et al. ...................... 725/28 |

OTHER PUBLICATIONS

International Search Report issued in PCT Application No. PCT/KR11/003966 dated Jan. 18, 2012.

Extended European Search Report for Application 11790002.7 dated Feb. 18, 2014.

\* cited by examiner

FIG. 10

|  | | 1601 | 1602 | 1603 | 1604 | 1605 |
|---|---|---|---|---|---|---|
| | USER | CP | first display device | second display device | the number of video signals |
| | USER 1 | CP 1 | 237. 32. 41. 52 | 010-277-375 | 12 |
| | | CP 2 | | | |
| | | ⋮ | | | |
| | USER 2 | CP 10 | 203. 245. 15. 17 | 019-1234-5555 | 5 |
| | | CP 11 | | | |
| | | ⋮ | | | |

USER INTERFACE PROVISION METHOD AND A SYSTEM USING THE METHOD

TECHNICAL FIELD

The present invention relates to a method for providing a user interface and a system using the method, and more specifically relates to a method for providing a user interface, in which video signals provided from a plurality of content providers are generated by a browsing interface and supplied to a display device, and a system using the method.

BACKGROUND ART

A digital broadcast receiver is an apparatus having a function for displaying videos which can be viewed by a user. The user may view broadcasting through the digital broadcast receiver. The digital broadcast receiver displays broadcasting selected by the user from broadcast signals transmitted from a broadcasting station.

Digital broadcasting means broadcasting for transmitting digital image and audio signals. Since digital broadcasting is robuster to external noise than analog broadcasting, it little causes data loss, is more favorable for error correction, has high resolution, and provides definite picture image. Also, digital broadcasting enables bidirectional services unlike analog broadcasting.

Recently, various types of contents services such as real-time broadcasting, contents on demand (COD), games and news may be provided using an Internet network connected with each home in addition to the existing propagation or wire cable medium.

An example of contents services based on an Internet network may include an internet protocol TV (IPTV). The IPTV means that various information services, moving picture contents and broadcasting are provided to a receiver of a user through the Internet network. The Internet network may be implemented on various kinds of networks, such as optical cable network, coaxial cable network, fiber to the home (FTTH), phone network, and wireless network, on an Internet protocol (IP).

In case of a service based on the Internet network described as above, unlike general terrestrial broadcasting, bidirectionality may be added, and the user may view its desired contents at his/her convenience time.

In the meantime, the number of content providers, which provide these contents, has been increased geometrically, and contents may be provided from a plurality of content providers to the digital broadcast receiver.

In order to select one of the plurality of content providers and use a predetermined content provider by the selected content provider, the user should first select one content provider through the digital broadcast receiver. In particular, as the number of content providers is increased, much time may be required to select one content provider, and the user may have inconvenience in viewing the contents.

Also, each of users who use the IPTV system may desire to receive information on contents provided by the IPTV system differently from the other users. However, a problem occurs in that the IPTV system according to the related art fails to meet such a request of the user.

DISCLOSURE

Technical Problem

Accordingly, an object of the present invention devised to solve the conventional problems is to provide a method for providing a user interface, which may meet various requests of a user by dynamically providing information on contents received from a content provider, and a system using the method.

Another object of the present invention is to provide a method for providing a user interface, in which information on contents provided from a content provider may differently be provided to each user, and a system using the method.

Technical Solution

According to one embodiment of the present invention, a method for controlling a server comprises the steps of receiving a plurality of video signals from a plurality of content providers through a receiving module, the video signals corresponding to moving thumbnail image data; decoding the received video signals through a decoder; muxing the decoded video signals through a multiplexer; generating a browsing interface, which outputs the muxed video signals on one screen, through a browsing interface generation module; encoding the generated browsing interface through an encoder; and transmitting the encoded browsing interface to an external display device.

According to another embodiment of the present invention, a method for providing a user interface comprises the steps of receiving a plurality of video signals from a plurality of content providers; muxing the video signals; generating a browsing interface where the video signals are output from one screen; encoding the generated browsing interface and outputting the encoded browsing interface to a first display device; and displaying the browsing interface on a display screen through the first display device.

According to still another embodiment of the present invention, a server comprises a receiving module receiving a plurality of video signals from a plurality of content providers, the video signals corresponding to moving thumbnail image data; a decoder decoding the received video signals; a multiplexer muxing the decoded video signals; a browsing interface generating module generating a browsing interface, which outputs the muxed video signals on one screen; an encoder encoding the generated browsing interface; and a transmitting module transmitting the encoded browsing interface to an external display device.

According to further still another embodiment of the present invention, a system comprises a server receiving a plurality of video signals from a plurality of content providers, muxing the video signals, generating a browsing interface where the video signals are output from one screen, encoding the generated browsing interface and outputting the encoded browsing interface to a display device; and the display device displaying the browsing interface received from the server on a display screen and displaying an option listing a device, which may output full contents corresponding to the selected video signals.

Advantageous Effects

The present invention is intended to solve the problems of the related art and provide a method for providing a user interface, which may meet various requests of a user by dynamically providing information on contents received from a content provider, and a system using the method.

Also, the present invention is intended to provide a method for providing a user interface, in which information on contents provided from a content provider may differently be provided to each user, and a system using the method.

Accordingly, the present invention is advantageous in that a browsing interface that outputs video signals provided from a plurality of content providers on one screen is provided to a display device, whereby a user may easily select a desired content from contents provided from a plurality of content providers.

In particular, the present invention is advantageous in that a browser provision system provides a browsing interface, which outputs a plurality of video signals, to a display device, whereby content provider information may be provided to a user without adding hardware (a plurality of tuners or network interface module) related to reception of a plurality of video signals or hardware related to browsing interface configuration to the display device.

BRIEF DESCRIPTION OF THE DRAWINGS

FIG. 10 is a diagram illustrating an example of a memory means of a browser provision system according to the present invention;

BEST MODE FOR CARRYING OUT THE INVENTION

Hereinafter, a method for providing a user interface and a system using the method according to the present invention will be described in more detail with reference to the accompanying drawings.

The suffixes "module" and "unit" for the elements used in the following description are given or used in common by considering facilitation in writing this disclosure only but fail to have meanings or roles discriminated from each other. Accordingly, the suffixes "module" and "unit" may be used together.

In the meantime, a digital broadcast receiver described in this specification corresponds to an intelligent digital broadcast receiver that additionally provides a computer support function in addition to a broadcasting receiving function. Accordingly, the digital broadcast receiver may be provided with a more convenient interface such as a manual input unit, a touch screen or a spatial remote controller. Also, the digital broadcast receiver enables e-mailing, web browsing, banking or games by accessing Internet or computer in accordance with the support of wire or wireless Internet function. For these various functions, a standardized general-purpose operating system (OS) may be used.

In other words, since the digital broadcast receiver disclosed in the present invention may freely be provided with or delete various applications on a general-purpose OS kernel, it may perform user-friendly various functions. More detailed example of the digital broadcast receiver may include a smart TV.

Figure 1:
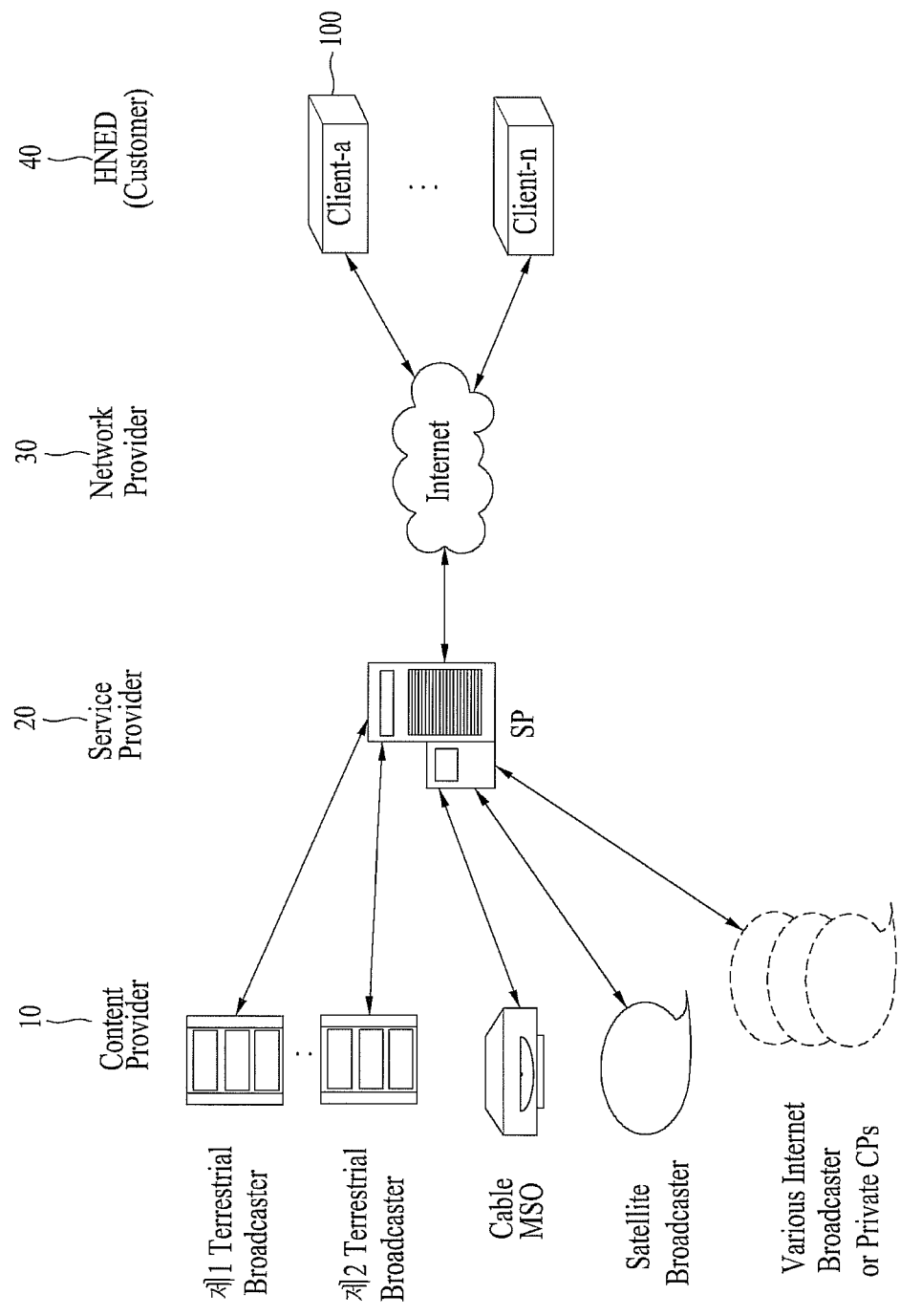
FIG. 1 is a brief diagram illustrating a digital broadcast receiver system according to the embodiment of the present invention.

FIG. 1 is a brief diagram illustrating a digital broadcast receiver system according to the embodiment of the present invention.

Referring to FIG. 1, the digital broadcast system according to the embodiment of the present invention includes a content provider (CP) 10, a service provider (SP) 20, a network provider (NP) 30, and a user (customer) 40, in view of contents service provision based on a broadcaster.

The content provider 10 manufactures various contents and provides them. Examples of the content provider may include a terrestrial broadcaster, a cable system operator (SO), a multiple system operator (MSO), a satellite broadcaster, and an Internet broadcaster, as illustrated in FIG. 1.

The service provider 20 may provide contents provided by the content provider 10 by service-packaging them. For example, the service provider 20 of FIG. 1 may package first terrestrial broadcasting, second terrestrial broadcasting, cable MSO, satellite broadcasting, various kinds of Internet broadcasting, application, etc. and provide the packaged one to a user.

In the meantime, the service provider 20 may provide a service to the user 40 by using a unicast or multicast mode. The unicast mode is to transmit data between a single transmitter and a single receiver 1:1. In case of the unicast mode, for example, if the receiver requests a server to transmit data, the server may transmit data to the receiver in accordance with the request. The multicast mode is to transmit data to a plurality of receivers of a specific group. For example, the server may transmit data to a plurality of receivers, which are previously registered therewith, at one time. For this multicast registration, IGMP (Internet Group Management Protocol) may be used.

The network provider 30 may provide a network for providing a service to the user 40. The user 40 may construct a home network end user (HNED) to receive a service.

Conditional access or content protection may be used to protect contents which are transmitted from the aforementioned digital broadcast receiver system. For conditional access or content protection, a cable card or downloadable conditional access system (DCAS) may be used.

In the meantime, the user 40 may provide contents through the network. In this case, the user 40 may be a content provider contrary to the above. The content provider 10 may receive contents from the user 40. In this case, it is advantageous in that bidirectional contents service or data service is available.

Figure 2:
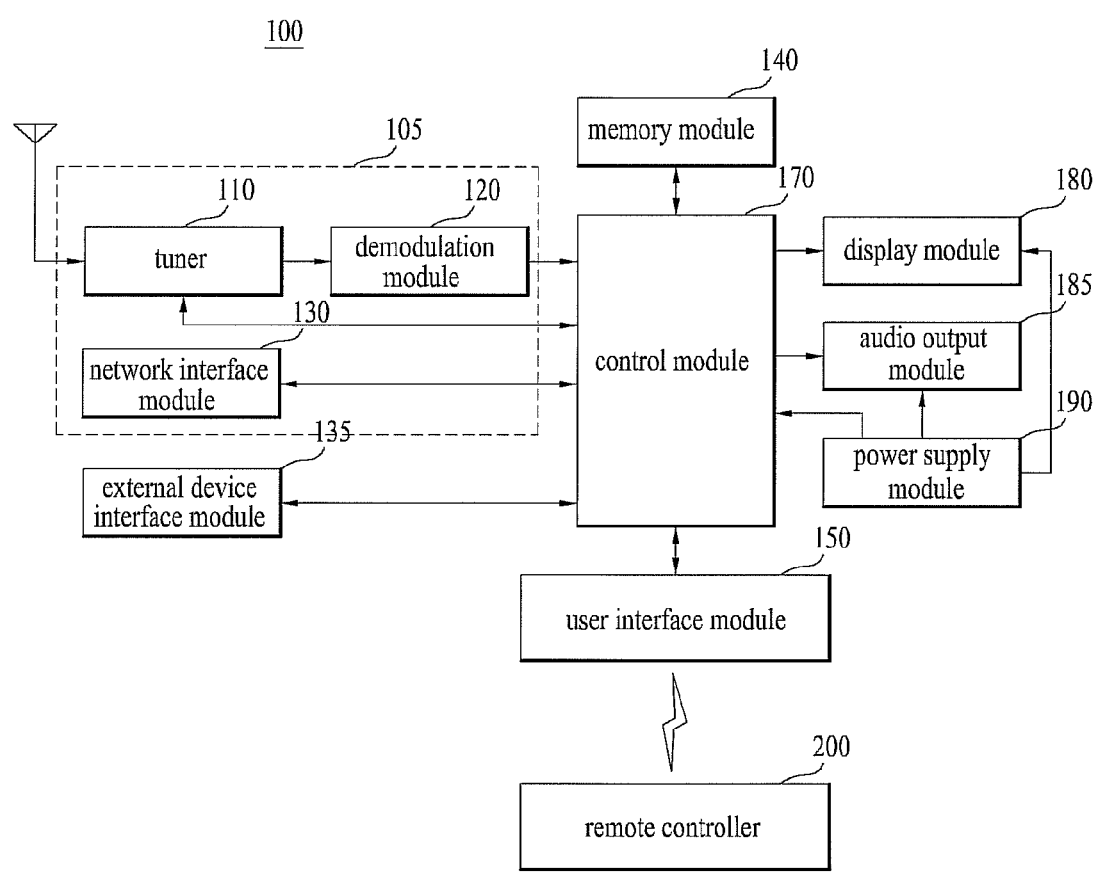
FIG. 2 is an inner block diagram illustrating a digital broadcast receiver according to one embodiment of the present invention.

FIG. 2 is an inner block diagram illustrating a digital broadcast receiver according to one embodiment of the present invention.

Referring to FIG. 2, the digital broadcast receiver 100 according to one embodiment of the present invention may include a broadcasting receiving module 105, an external device interface module 135, a memory module 140, a user input interface module 150, a control module 170, a display module 180, an audio output module 185, and a power supply module 190. The broadcasting receiving module 105 may include a tuner 110, a demodulation module 120, and a network interface module 130. The broadcasting receiving module 105 may be designed to include the tuner 110 and the demodulation module 120 without the network interface module 130 if necessary. On the other hand, the broadcasting receiving module 150 may be designed to include only the network interface module 130 without the tuner 110 and the demodulation module 120.

The tuner 110 selects one of radio frequency (RF) broadcast signals received through an antenna, which corresponds to a channel selected by a user or all previously stored channels. Also, the tuner 110 converts the selected RF broadcast signal to an intermediate frequency signal or a baseband video or audio signal.

For example, if the selected RF broadcast signal is a digital broadcast signal, the tuner 110 coverts the selected RF broadcast signal to a digital IF (DIF) signal. If the selected RF broadcast signal is an analog broadcast signal, the tuner 110 coverts the selected RF broadcast signal to an analog baseband video or audio signal (CVBS/SIF). In other words, the tuner 110 may process both the digital broadcast signal and the analog broadcast signal. The analog baseband video or audio signal (CVBS/SIF) output from the tuner 110 may directly be input to the control module 170.

Also, the tuner 110 may receive RF broadcast signal of a single carrier based on an advanced television system committee (ATSC) mode or RF broadcast signal of multiple carriers based on a digital video broadcasting (DVB) mode.

In the meantime, the tuner 110 sequentially selects RF broadcast signals of all the broadcast channels stored through a channel memory function from the RF broadcast signals received through the antenna, and converts the selected RF broadcast signals to intermediate frequency signals or baseband video or audio signals.

The demodulation module 120 receives the digital IF (DIF) signal converted by the tuner 110 and demodulates the received digital IF signal.

For example, if the digital IF signal output from the tuner 110 is based on the ATSC mode, the demodulation module 120 performs 8-vestigal side band (8-VSB) demodulation, for example. Also, the demodulation module 120 may perform channel decoding. To this end, the demodulation module 120 may include a trellis decoder, a de-interleaver, and a Reed-Solomon decoder to perform trellis decoding, de-interleaving, and Reed-Solomon decoding.

For example, if the digital IF signal output from the tuner 110 is based on the DVB mode, the demodulation module 120 performs coded orthogonal frequency division modulation (COFDMA) demodulation, for example. Also, the demodulation module 120 may perform channel decoding. To this end, the demodulation module 120 may include a convolution decoder, a de-interleaver, and a Reed-Solomon decoder to perform convolution decoding, de-interleaving, and Reed-Solomon decoding.

The demodulation module 120 may output a stream signal (TS) after performing demodulation and channel decoding. At this time, the stream signal may be a signal where a video signal, an audio signal and a data signal are multiplexed. For example, the stream signal may be MPEG-2 Transport Stream (TS) where a video signal of an MPEG-2 specification and an audio signal of Dolby AC-3 specification are multiplexed. Specifically, the MPEG-2 TS may include a 4 byte header and 184 byte payload.

In the meantime, the aforementioned demodulation module 120 may be provided separately depending on the ATSC mode and the DVB mode. Namely, an ATSC demodulation module and a DVB demodulation module may be provided separately.

The stream signal output from the demodulation module 120 may be input to the control module 170. The control module 170 performs demultiplexing, video/audio signal processing, etc. and then outputs video to the display module 180 and audio to the audio output module 185.

The external device interface module 135 may connect an external device to the digital broadcast receiver 100. To this end, the external device interface module 135 may include an A/V input/output module (not shown) or a wireless communication module (not shown).

The external device interface module 135 may be connected to the external electronic device 315 such as Digital Versatile Disks (DVD), Blu-rays, game devices, cameras, camcorders, computers (e.g., notebook computers), etc. through wire/wireless cables. The external device interface module 135 transmits the AV signals including video, audio, or data signal externally input through an external device connected thereto, to the control module 170 of the digital broadcast receiver 100. Also, the external device interface module 135 may output the video, audio or data signal processed by the control module 170 to the external device. To this end, the external device interface module 135 may include an A/V input/output module (not shown) or a wireless communication module (not shown).

The A/V input/output module may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., to input video and audio signals of the external device to the digital broadcast receiver 100.

The wireless communication module may perform short range wireless communication with other electronic devices, for example, browser provision system or display devices, which will be described later. The digital broadcast receiver 100 may be connected with the other electronic devices through the network in accordance with the communication standards such as Bluetooth, Radio Frequency Identification (RFID), infrared Data Association (IrDA), Ultra Wideband (UWB), ZigBee, Digital Living Network Alliance (DLNA), etc.

Also, the external device interface module 135 may be connected to various set-top boxes through at least one of the above-mentioned various terminals to perform input/output operation with the set-top boxes.

In the meantime, the external device interface module 135 may receive an application or a list of applications from its neighboring external device and transfer the received application or the list of applications to the control module 170 or the memory module 140.

The network interface module 130 provides an interface for connecting the digital broadcast receiver 100 with wire/wireless networks including Internet network. The network interface module 130 may include an Ethernet terminal, for example, for wire network connection. For example, Wireless LAN (WLAN)(Wi-Fi), Wireless broadband (Wibro), World Interoperability for Microwave Access (Wimax), High Speed Downlink Packet Access (HSDPA) may be used for the wireless network connection.

The network interface module 130 may access a predetermined web page through a network. In other words, the network interface module 130 may transmit or receive data to and from a corresponding server by accessing the predetermined web page through the corresponding network. In addition, the network interface module 130 may receive contents or data provided by the content provider or the network operator. In other words, the network interface module 130 may receive contents, such as movies, advertisements, games, VOD, and broadcast signals, and related information, which are provided from the content provider or the network provider through the network. Also, the network interface module 130 may receive update information and update files of firmware provided by the network operator. Moreover, the network interface module 130 may transmit data to the Internet or content provider or the network operator.

Furthermore, the network interface module 130 may selectively receive a desired one of applications open to the public, through the network.

Also, the network interface module 130 may receive a browsing interface from the browser provision system, which will be described later, through the network.

The control module 170 controls overall operations of the digital broadcast receiver 100m to receive the browsing interface from the browser provision system through the network and output the browsing interface, and to receive and output the video signal selected by the browsing interface. Also, the control module 170 may perform payment of the video signal selected by the browsing interface.

The memory module 140 may store a program for processing and controlling each signal of the control module 170, or may store the processed video, audio or data signal.

Also, the memory module 140 may temporarily store the video, audio or data signal input from the external device interface module 135 or the network interface module 130. The memory module 140 may also store information on a predetermined broadcast channel through a channel memory function.

Also, the memory module 140 may store the application or the list of the applications input from the external device interface module 135 or the network interface module 130.

The memory module 140 may include a storage medium of at least one type of a flash memory type, a hard disk type, a multimedia card micro type, a card type memory (for example, SD or XD memory), RAM and ROM (EEPROM, etc.) The digital broadcast receiver 100 may play contents files (moving picture files, still image files, music files, document files, application files, etc.) stored in the memory module 140 to provide the played contents files to the user.

Although FIG. 2 illustrates that the memory module 140 is provided separately from the control module 170, the scope of the present invention is not limited by the embodiment of FIG. 2. The memory module 140 may be included in the control module 170.

The user input interface module 150 transmits the signal input by the user to the control module 170 or transmits the signal from the control module 170 to the user.

For example, the user input interface module 150 may receive a user input signal or control signal such as power on/off, channel selection and screen setup from a remote controller 200 or transmit the control signal from the control module 170 to the remote controller 200 in accordance with various communication modes such as RF communication mode and IR communication mode.

Also, for example, the user input interface module 150 may transmit a user input signal or control signal input by a local key (not shown) such as a power key, a channel key, a volume key, and a setup key to the control module 170.

Also, for example, the user input interface module 150 may transmit a user input signal or control signal input by a sensing module (not shown), which senses gesture of the user, to the control module 170, or may transmit the signal from the control module 170 to the sensing module. In this case, the sensing module may include a touch sensor, an audio sensor, a position sensor, an action sensor, etc.

The control module 170 may demultiplex input streams and processes the demultiplexed streams through the tuner 110, the demodulation module 120 or the external device interface module 135 to generate and output signals for video and audio output.

The video signal video-processed by the control module 170 may be input to the display module 180 and then displayed as a video corresponding to the corresponding video signal.

Also, the control module 170 may receive the browsing interface from the browser provision system through the network and output the browsing interface, and may receive and output the video signal selected by the browsing interface. Also, the control module 170 may perform payment of the video signal selected by the browsing interface.

Also, the video signal video-processed by the control module 170 may be input to the external output device through the external device interface module 135.

The audio signal processed by the control module 170 may be output to the audio output module 185. Also, the audio signal processed by the control module 170 may be input to the external output device through the external device interface module 135.

Although now shown in FIG. 2, the control module 170 may include a demultiplexer and a video processor. The demultiplexer and the video processor will be described later with reference to FIG. 4.

In addition, the control module 170 may control overall operations of the digital broadcast receiver 100. For example, the control module 170 may control the tuner 110 to tune RF broadcasting corresponding to the channel selected by the user or the previously stored channel.

Also, the control module 170 may control the digital broadcast receiver 100 through a user command input through the user input interface module 150 or its internal program. In particular, the control module 170 may allow the user to download a desired application or application list into the digital broadcast receiver 100 by accessing the network.

For example, the control module 170 controls the tuner 110 to input a signal of a channel selected in accordance with a predetermined channel selection command received through the user input interface module 150, and processes a video, audio or data signal of the selected channel. The control module 170 may allow the channel information selected by the user to be output through the display module 180 or the audio output module 185 together with the processed video or audio signal.

For another example, the control module 170 may allow a video signal or audio signal from the external device, for example, camera or camcorder, which is input through the external device interface module 135, to be output through the display module 180 or the audio output module 185 in accordance with an external device video play command received through the user input interface module 150.

In the meantime, the control module 170 may control the display module 180 to display a video. For example, the control module 170 may control the display module 180 to display broadcasting image input through the tuner 110, external input image input through the external device interface module 135, image input through the network interface module, or image stored in the memory module 140. At this time, the image displayed in the display module 180 may be still image or moving image, and may be 2D image or 3D image.

The control module 170 may control the display module 180 to display application or application list, which may be downloaded from the internal or external network of the digital broadcast receiver 100, in case of an application viewing item.

The control module 170 may control the application downloaded from the external network to be installed and driven together with various user interfaces. Also, the control module 170 may control the video related to the application implemented by selection of the user to be displayed in the display module 180.

In the meantime, although not shown, a channel browsing processor, which generates thumbnail image corresponding to the channel signal or external input signal, or the browser provision system, which will be described later, may further be provided. The channel browsing processor may receive the stream signal (TS) output from the demodulation module 120 or the stream signal output from the external device interface module 135 and extract video from the input stream signal to generate the thumbnail image. The generated thumbnail image may be input to the control module 170 as it is. Also, the thumbnail image may be encoded in a stream format and then input to the control module 170. The control module 170 may display a thumbnail list that includes a plurality of thumbnail images, in the display module 180 by using the input thumbnail image. The thumbnail images of the thumbnail list may be updated in due order or at the same time. Then, the user may simply recognize contents of a plurality of broadcast channels.

The display module 180 converts the video, data and OSD signals processed by the control module 170 or the video and data signals received from the external device interface module 135 to R, G, B signals, respectively, to generate driving signals.

Examples of the display module 180 may include PDP, LCD, OLED, flexible display, and 3D display.

In the meantime, a touch screen may be used as the display module 180, whereby the display module 180 may be used as an input module as well as an output device.

The audio output module 185 receives the signal audio-processed by the control module 170, for example, stereo signal, 3.1 channel signal or 5.1 channel signal, and outputs the received signal as sound. Various types of speakers may be used as the audio output module 185.

In the meantime, the digital broadcast receiver 100 may further include a camera module (not shown) that takes a user. Although one camera module may be provided, a plurality of camera modules may be provided. Image information taken by the camera module may be input to the control module 170.

In the meantime, in order to sense gesture of the user, the digital broadcast receiver 100 may further include a sensing module (not shown), which includes at least one of a touch sensor, an audio sensor, a position sensor, and an action sensor, as described above. The signal sensed by the sensing module may be transmitted to the control module 170 through the user input interface module 150.

The control module 170 may sense gesture of the user by using the image taken from the camera module (not shown) and the signal sensed from the sensing module, respectively or in combination.

The power supply module 190 supplies the corresponding power to the whole portion of the digital broadcast receiver 100. In particular, the power supply module 190 may supply the power to the control module 170 that can be implemented in the form of a system on chip (SOC), the display module 180 for image display, and the audio output module 185 for audio output.

To this end, the power supply module 190 may further include a converter (not shown) that converts an alternating current power to a direct current power. In the meantime, if the display module 180 is implemented as a liquid crystal panel that includes a plurality of back light lamps, for example, for luminance variable or dimming driving, the power supply module 190 may further include an inverter (not shown) that enables PWM operation.

The remote controller 200 transmits a user input to the user input interface module 150. To this end, the remote controller 200 may use Bluetooth, Radio Frequency (RF) communication, infrared (IR) communication, Ultra Wideband (UWB), ZigBee, etc.

Also, the remote controller 200 may receive the video, audio or data signal output from the user input interface module 150 to display the received signal or output audio or vibration.

The aforementioned digital broadcast receiver 100 100 may be a fixed type digital broadcast receiver that can receive at least one of digital broadcasting of ATSC mode (8-VSB mode), digital broadcasting of DVB-T mode (COFDM mode), and digital broadcasting of ISDB-T mode (BST-OFDM mode).

In the meantime, the digital broadcast receiver disclosed in this specification is a digital broadcast receiver that does not include the display module 180 and the audio output module 185 shown in FIG. 2, and may be a wireless type digital broadcast receiver that transmits and receives data to and from the display module 180 and the audio output module 185 through wireless communication.

In the meantime, the block diagram of the digital broadcast receiver 100 illustrated in FIG. 2 is for one embodiment of the present invention. The respective elements of the block diagram may be incorporated, added or omitted depending on options of the digital broadcast receiver 100 which is actually implemented. In other words, two or more elements may be incorporated into one element, or one element may be divided into two or more elements, as occasion demands. Also, the function performed by each block is intended for description of the embodiment of the present invention, and its detailed action or device does not limit claims of the present invention.

In the meantime, unlike the embodiment illustrated in FIG. 2, the digital broadcast receiver 100 may receive and play video contents through the network interface module 130 or the external device interface module 135 without the tuner 110 and the demodulation module 120 illustrated in FIG. 2.

Figure 3:
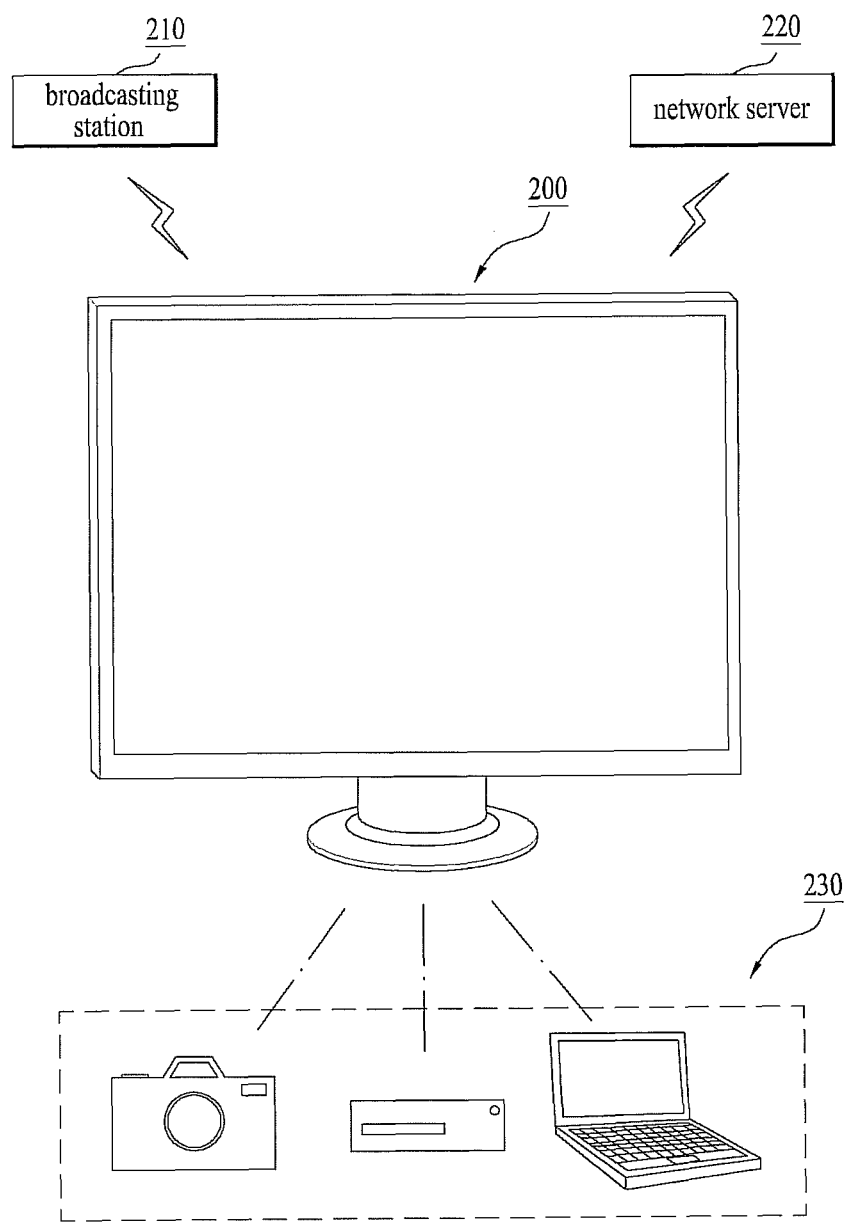
FIG. 3 is a diagram illustrating an apparatus that may transmit and receive data to and from a digital broadcast receiver of FIG. 2.

FIG. 3 is a diagram illustrating an apparatus that may transmit and receive data to and from a digital broadcast receiver of FIG. 2.

Referring to FIG. 3, the digital broadcast receiver according to one embodiment of the present invention may perform communication with a broadcasting station 210, a network server 220 or an external device 230.

The digital broadcast receiver 100 may receive a broadcast signal, which includes a video signal transmitted from the broadcasting station. The digital broadcast receiver 100 may process the video signal, audio signal or data signal included in the broadcast signal, whereby the video signal, audio signal or data signal may be output from the digital broadcast receiver 100. The digital broadcast receiver 100 may output video or audio based on the processed video signal.

In the meantime, the digital broadcast receiver 100 may perform communication with the network server 200. The network server 220 is a device that may transmit and receive a signal to and from the digital broadcast receiver 100 through a random network. For example, the network server 220 may be a cellular phone terminal that may be connected with the digital broadcast receiver 100 through a wire or wireless base station. Also, the network server 220 may be a device that may provide contents to the digital broadcast receiver 100 through Internet network. The content provider may provide contents to the digital broadcast receiver 100 by using the network server.

In the meantime, the digital broadcast receiver 100 may perform communication with the external device 230. The external device 230 is a device that may directly transmit and receive a signal to and from the digital broadcast receiver 100 through a wire or wireless network. For example, the external device 230 may be a media memory device or a media player, which is used by the user. In other words, the external device 230 may be a camera, a DVD player, a blu-ray player, or a personal computer.

The broadcasting station 210, the network server 220 or the external device 230 may transmit a signal, which includes a video signal, to the digital broadcast receiver 100. The digital broadcast receiver 100 may display video based on the video signal included in the input signal. Also, the digital broadcast receiver 100 may transmit the signal, which is transmitted from the broadcasting station 210 or the network server 220 to the digital broadcast receiver 100, to the external device 230. Also, the digital broadcast receiver 100 may transmit the signal, which is transmitted from the external device 230 to the digital broadcast receiver 100, to the broadcasting station 210 or the network server 220. In other words, the digital broadcast receiver 100 may serve to directly play and transmit the contents included in the signal transmitted form the broadcasting station 210, the network server 220 and the external device 230.

Figure 4:
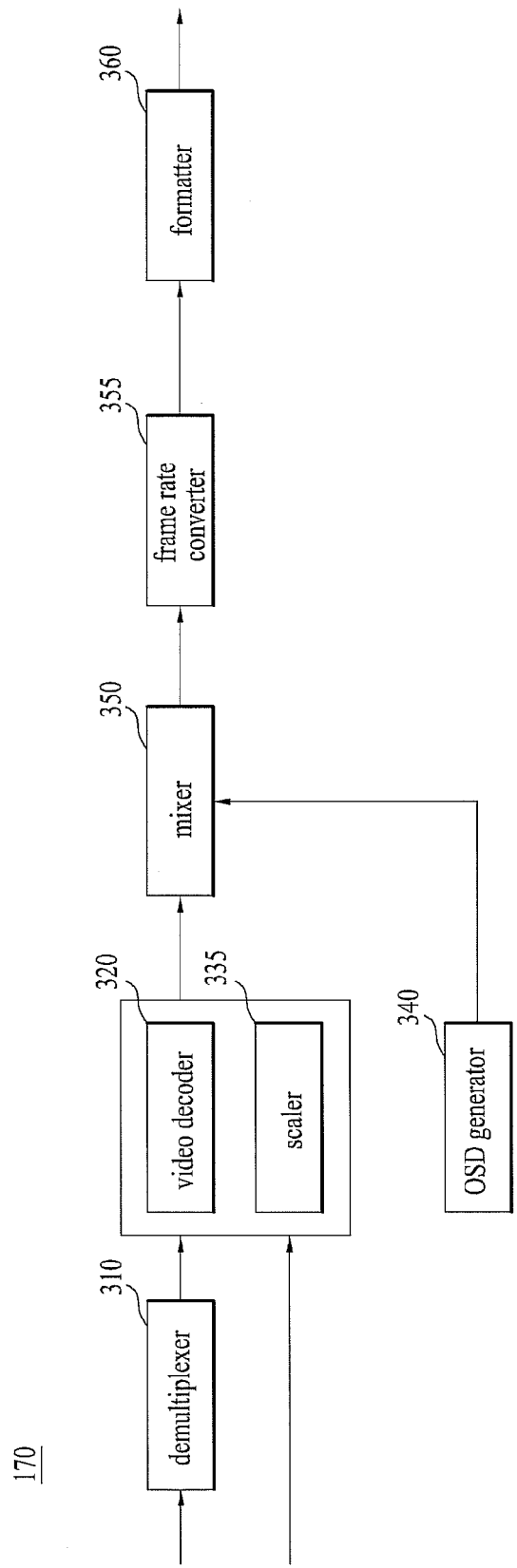
FIG. 4 is an inner block diagram illustrating a control module of FIG. 2.

FIG. 4 is an inner block diagram illustrating a control module of FIG. 2.

Referring to FIG. 4, the control module 170 according to one embodiment of the present invention may include a demultiplexer 310, a video processor 320, an OSD generator 340, a mixer 350, a frame rate converter 355, and a formatter 360. The control module 170 may further include an audio processor (not shown) and a data processor (not shown).

The demultiplexer 310 demultiplexes input streams. For example, if MPEG-2 TS is input, the demultiplexer 310 demultiplexes the MPEG-2 TS and splits the demultiplexed MPEG-2 TS into a video signal, an audio signal and a data signal. In this case, the stream signal input to the demultiplexer 310 may be the stream signal output from the tuner 110, the demodulation module 120, or the external device interface module 135.

The video processor 320 may process the demultiplexed video signal. To this end, the video processor 320 includes a video decoder 325 and a scaler 335.

The video decoder 325 decodes the demultiplexed video signal, and the scaler 335 performs scaling to output resolution of the decoded video signal through the display module 180.

The video decoder 325 may include decoders having various specifications.

For example, if the demultiplexed video signal is an encoded video signal of the MPEG-2 specification, it may be decoded by an MPEG-2 decoder.

Also, for example, if the demultiplexed video signal is an encoded video signal of the H.264 specification based on a Digital Multimedia Broadcasting (DMB) mode or DVB-H mode, it may be decoded by an H.264 decoder.

In the meantime, the video signal decoded by the video processor 320 is input to the mixer 350.

The OSD generator 340 generates an OSD signal in accordance with the input of the user or by itself. For example, the OSD generator 340 may generate a signal for displaying various kinds of information on the screen of the display module 180 in the form of graphic or text based on the user input signal or the control signal. The generated OSD signal may include various data such as a user interface screen of the digital broadcast receiver 100, a screen of various menus, widget, and icon.

For example, the OSD generator 340 may generate a signal for displaying broadcast information based on EPG or caption of broadcast video.

The mixer 350 may mix the OSD signal generated by the OSD generator 340 with the decoded video signal processed by the video processor 220. The mixed signal is provided to the formatter 360. As the decoded broadcast video signal or the external input signal is mixed with the OSD signal, the OSD may be overlaid on the broadcast video or the external input video.

The frame rate converter (FRC) 355 may convert a frame rate of the input video. For example, the frame rate converter 355 converts a frame rate of 60 Hz to a frame rate of 120 Hz or 240 Hz. If the frame rate converter 355 converts the frame rate of 60 Hz to the frame rate of 120 Hz, a first frame may be inserted between another first frame and the second frame, or a third frame predicted from the first frame and the second frame may be inserted between the first frame and the second frame. If the frame rate converter 355 converts the frame rate of 60 Hz to the frame rate of 240 Hz, three same frames may be inserted between the first frame and the second frame, or the third frame predicted from the first frame and the second frame may be inserted between the first frame and the second frame. In the meantime, the input frame rate may be maintained without separate conversion.

The formatter 360 receives an output signal of the frame rate converter 355, changes a format of the signal to conform to the display module 180, and then outputs the changed format. For example, the formatter 360 may output R, G, B data signals. The R, G, B data signals may be output as low voltage differential signaling (LVDS) or mini-LVDS.

In the meantime, the audio processor (not shown) in the control module 170 may perform audio processing of the demultiplexed audio signal. To this end, the audio processor may include various decoders.

If the demultiplexed audio signal is an encoded audio signal, the audio processor in the control module 170 may decode the encoded audio signal. For example, the demultiplexed audio signal may be decoded by an MPEG-2 decoder, MPEG-4 decoder, AAC decoder, or AC-3 decoder.

Also, the audio processor in the control module 170 can process base, treble and sound volume control.

The data processor (not shown) in the control module 170 may perform data processing of the demultiplexed data signal. For example, if the demultiplexed data signal is an encoded data signal, the data processor in the control module 170 may decode the encoded data signal. The encoded data signal may be electronic program guide (EPG) information that includes broadcast information such as start time and end time of a broadcast program broadcasted from each channel. For example, the EPG information may be ATSC-Program and System information protocol (ATSC-PSIP) information in case of the ATSC mode, and may include DVB-Service Information (DVB-SI) in case of the DVB mode. The ATSC-PSIP information or the DVB-SI information may be information included in the aforementioned stream, i.e., a header (4 byte) of the MPEG-2 TS.

In the meantime, since the block diagram of the control module 170 illustrated in FIG. 4 is for one embodiment of the present invention. The respective elements of the block diagram may be incorporated, added or omitted depending on options of the control module 170 which is actually implemented.

Figure 5A:
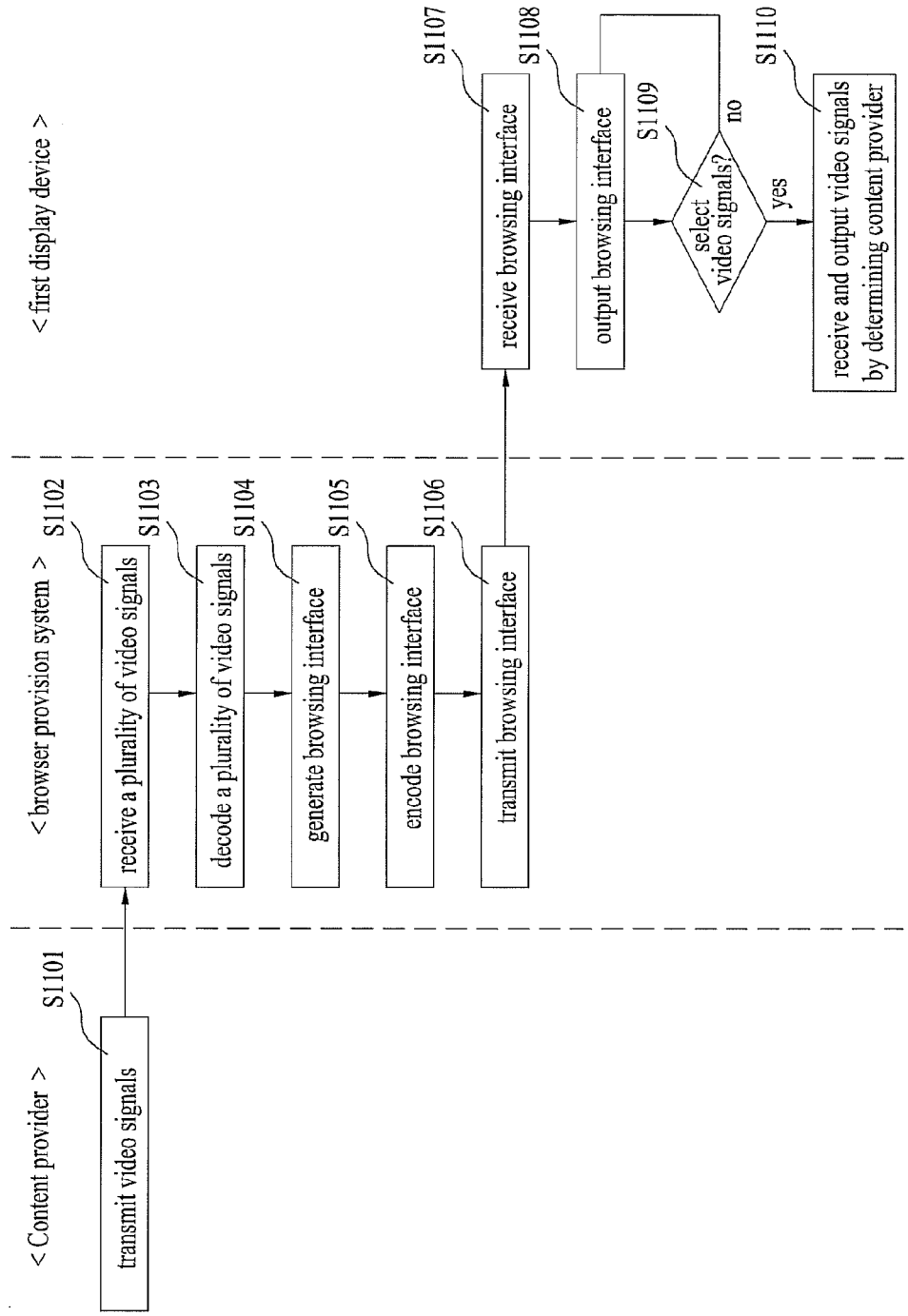
FIG. 5a is a flow chart illustrating a procedure of providing a user interface in accordance with one embodiment of the present invention.

FIG. 5a is a flow chart illustrating a procedure of providing a user interface in accordance with one embodiment of the present invention. Referring to FIG. 5a, the user interface provision system according to one embodiment of the present invention may include a browser provision system or a display device.

At this time, the display device may include all the means that may output a browsing interface output from the browsing provision system. In this respect, the display device may include the digital broadcast receiver, the cellular phone terminal, the personal computer, etc. as described above, and the browser provision system may transmit and receive a signal to and from the display device through a random network.

Also, the browser provision system is defined as a system that generates a browsing interface by using the video signal received from the content provider and outputs the browsing interface to the display device, and may be connected with the display device and the content provider through the network. Moreover, the browser provision system may be included in the digital broadcast receiver.

At step S1101, the content provider transmits the video signal to the browser provision system. At this time, examples of the content provider may include a terrestrial broadcaster, a cable system operator (SO), a multiple system operator (MSO), a satellite broadcaster, and Internet broadcaster. Also, the content provider may provide various applications in addition to broadcast contents.

The browser provision system receives the video signals from a plurality of content providers at step S1102, and decodes the received video signal at step S1103 if necessary.

Next, the browser provision system muxes the decoded video signals at step S1104 and then generates the browsing interface where the muxed video signals are output on one screen.

At this time, the browser provision system may store the video signals selected by the user or the content provider selected by the user in the memory means and then determine the video signals for muxing referring to the memory means. The memory means may include at least one type memory of a flash memory type, a hard disk type, a multimedia card micro type, a card type memory (for example, SD or XD memory), RAM and ROM (EEPROM, etc.)

If the video signals for muxing are determined, the browser provision system generates a browsing interface where the decoded video signals are output on one screen.

At this time, the browsing interface may be configured by continuous pages, and may store content provider information of the video signals included per page in the memory means.

Also, according to the embodiment of the present invention, the video signals included in the browsing interface may be input selectively by the user, and the number of video signals included in the browsing interface may be input selectively from the user.

At step S1105, the browsing provision system encodes the browsing interface and then outputs the encoded browsing interface to a first display device at step S1106. At this time, the browser provision system may be connected with the first display device or a second display device, which will be described later, through a wire or wireless network. For example, the browser provision system may be connected with the first display device or the second display device through the network in accordance with the communication standards such as Bluetooth, Radio Frequency Identification (RFID), infrared Data Association (IrDA), Ultra Wideband (UWB), ZigBee, Digital Living Network Alliance (DLNA), etc.

After receiving the browsing interface at step S1107, the first display device decodes the browsing interface if necessary, and then outputs the decoded browsing interface to the display screen at step S1108.

The video signals included in the browsing interface may be input selectively by the user in accordance with the embodiment, and the number of video signals included in the browsing interface may be input selectively from the user.

For example, the browsing interface may provide the video signals included therein and a menu that may select the number of video signals, and the user may select the video signals output from the browsing interface or the number of video signals.

If the user selects the video signals or the number of video signals, the first display device provides the selected information to the browser provision system, and the browser provision system muxes the video signals depending on the selected information to generate the browsing interface, and then outputs the generated browsing interface to the first display device.

Also, the browsing interface may be configured by continuous pages in accordance with the embodiment, and may store content provider information of the video signals included per page in the memory means.

At this time, the browser provision system determines the page of the browsing interface, which is being output to the first display device, and content provider information of the video signals included in the continuous pages, and then receives the video signals from the determined content provider to generate the browsing interface of the continuous pages, whereby the generated browsing interface may be loaded in the memory means (for example, buffer).

If the user selects page shifting from the first display device, the first display device transmits a paging shifting command to the browser provision system. If the page shifting command is received, the browser provision system outputs the browsing interface loaded in the memory means to the first display device.

At step S1109, the first display device determines whether one or more of the video signals included in the browsing interface are selected.

As a result of the step S1109, if one or more of the video signals included in the browsing interface are selected, the first display device determines the content provider of the selected video signals at step S1110 and then receives the video signals and outputs the received video signals on the display screen.

Accordingly, the present invention is advantageous in that the browsing interface where the video signals provided from the plurality of content providers are output on one screen is provided to the display device and, as a result, the user may easily select a desired content from the contents provided from the plurality of content providers.

In particular, as the browser provision system provides the browsing interface, where the plurality of video signals are output, to the display device, it is advantageous in that the content provider information may be provided to the user without adding hardware (a plurality of tuners or network interface module) related to reception of the plurality of video signals or hardware related to browsing interface configuration to the display device.

Figure 5B:
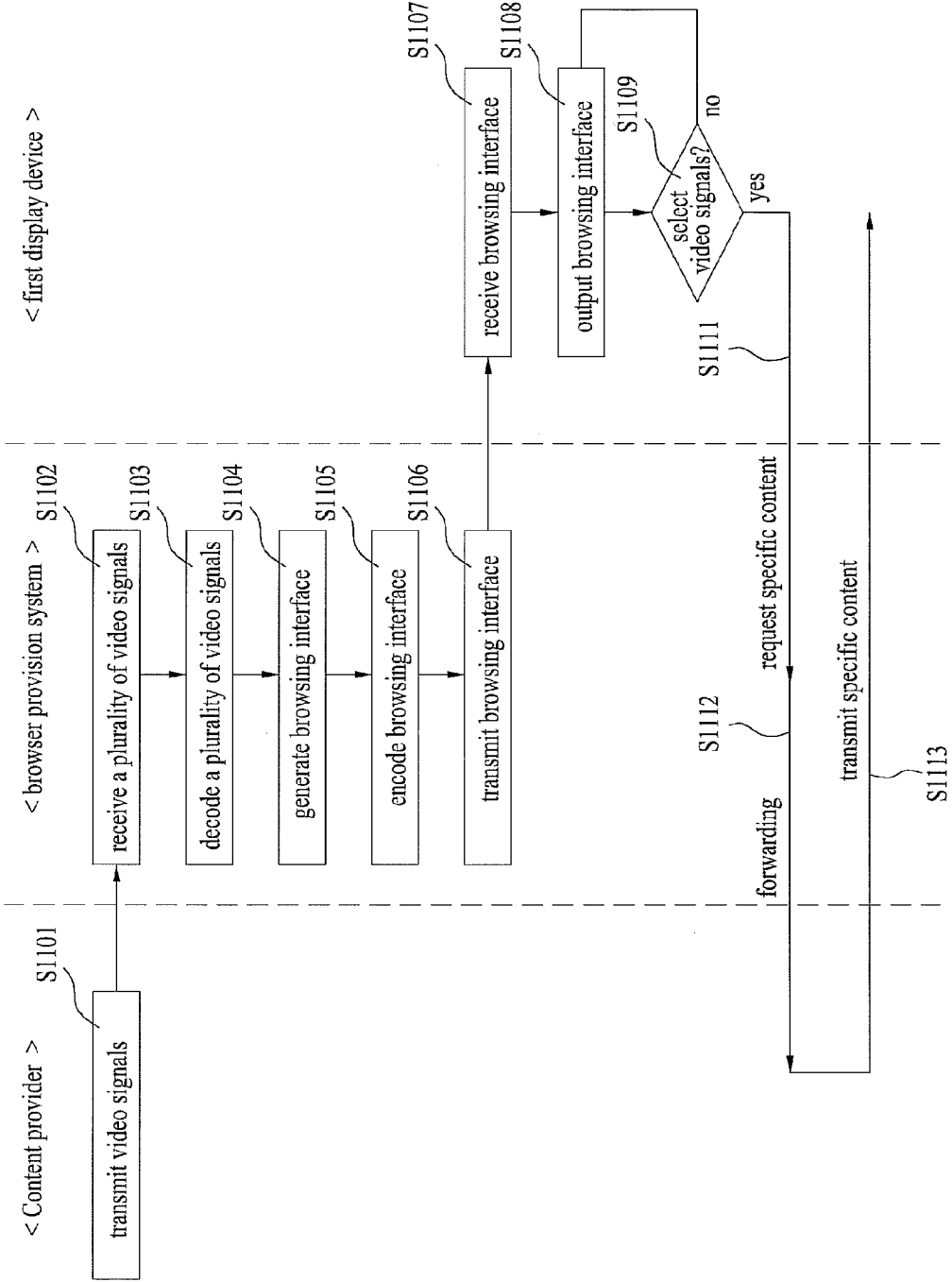
FIG. 5b is a flow chart illustrating a procedure of providing a user interface in accordance with another embodiment of the present invention.

FIG. 5b is a flow chart illustrating a procedure of providing a user interface in accordance with another embodiment of the present invention. FIG. 5b is a flow chart illustrating another embodiment of the step S1110 shown in FIG. 5a. Accordingly, the description corresponding to the aforementioned steps S1101 to S1109 will be omitted.

The first display device requests the browser provision system of a content corresponding to the selected video signal (S1111). The browser provision system forwards the request signal received at the step S1111 to the content provider (S1112). And, the content provider transmits a content corresponding to the selected video signal to the first display device or the second display device (S1113).

Figure 5C:
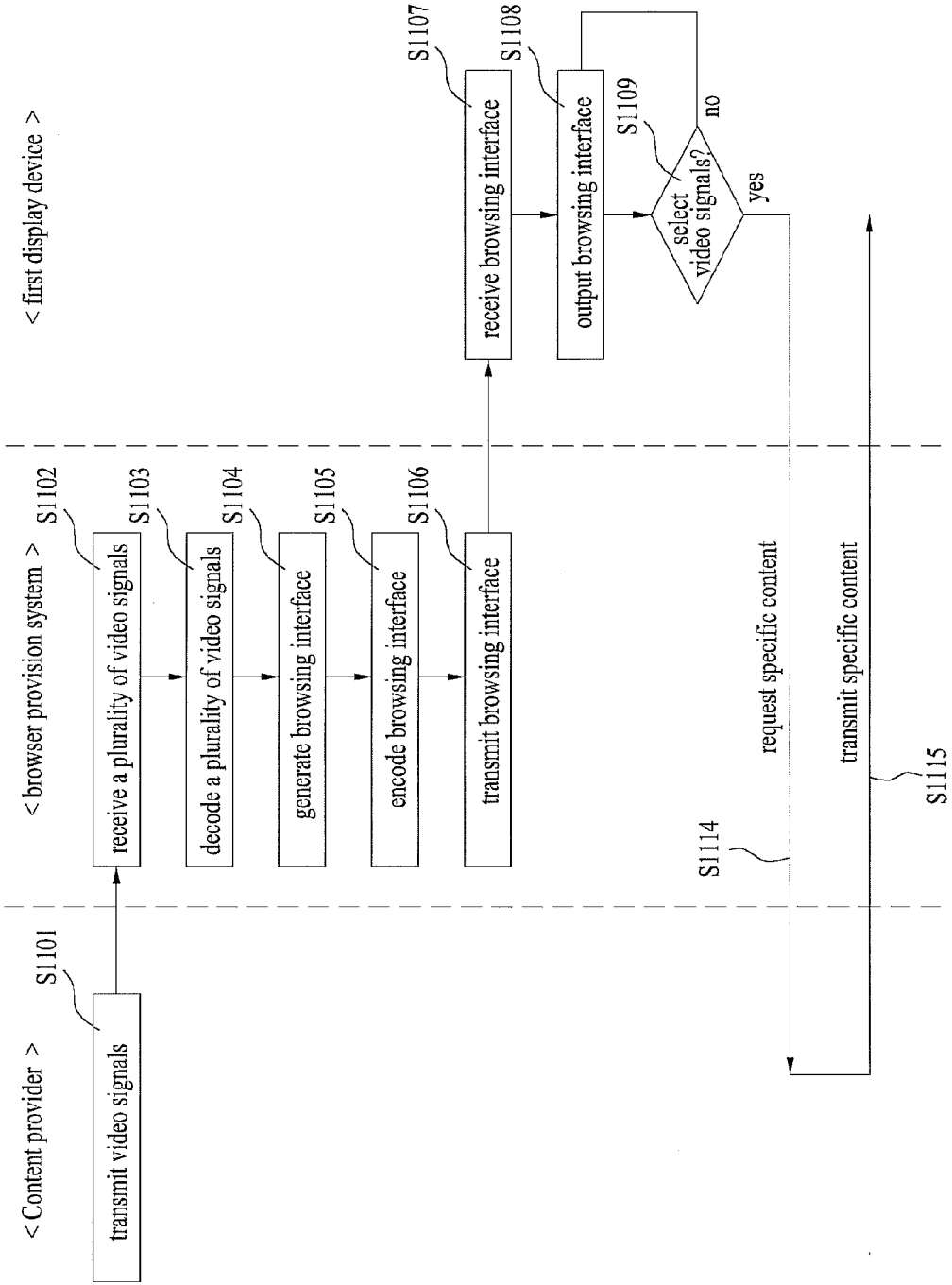
FIG. 5c is a flow chart illustrating a procedure of providing a user interface in accordance with other embodiment of the present invention.

FIG. 5c is a flow chart illustrating a procedure of providing a user interface in accordance with other embodiment of the present invention. FIG. 5c is a flow chart illustrating other embodiment of the step S1110 shown in FIG. 5a. Accordingly, the description corresponding to the aforementioned steps S1101 to S1109 will be omitted.

The first display device directly requests the corresponding content provider of a content corresponding to the selected video signal (S1114). The content provider is designed to transmit the content corresponding to the selected video signal to the first display device or the second display device (S1115).

Figure 6:
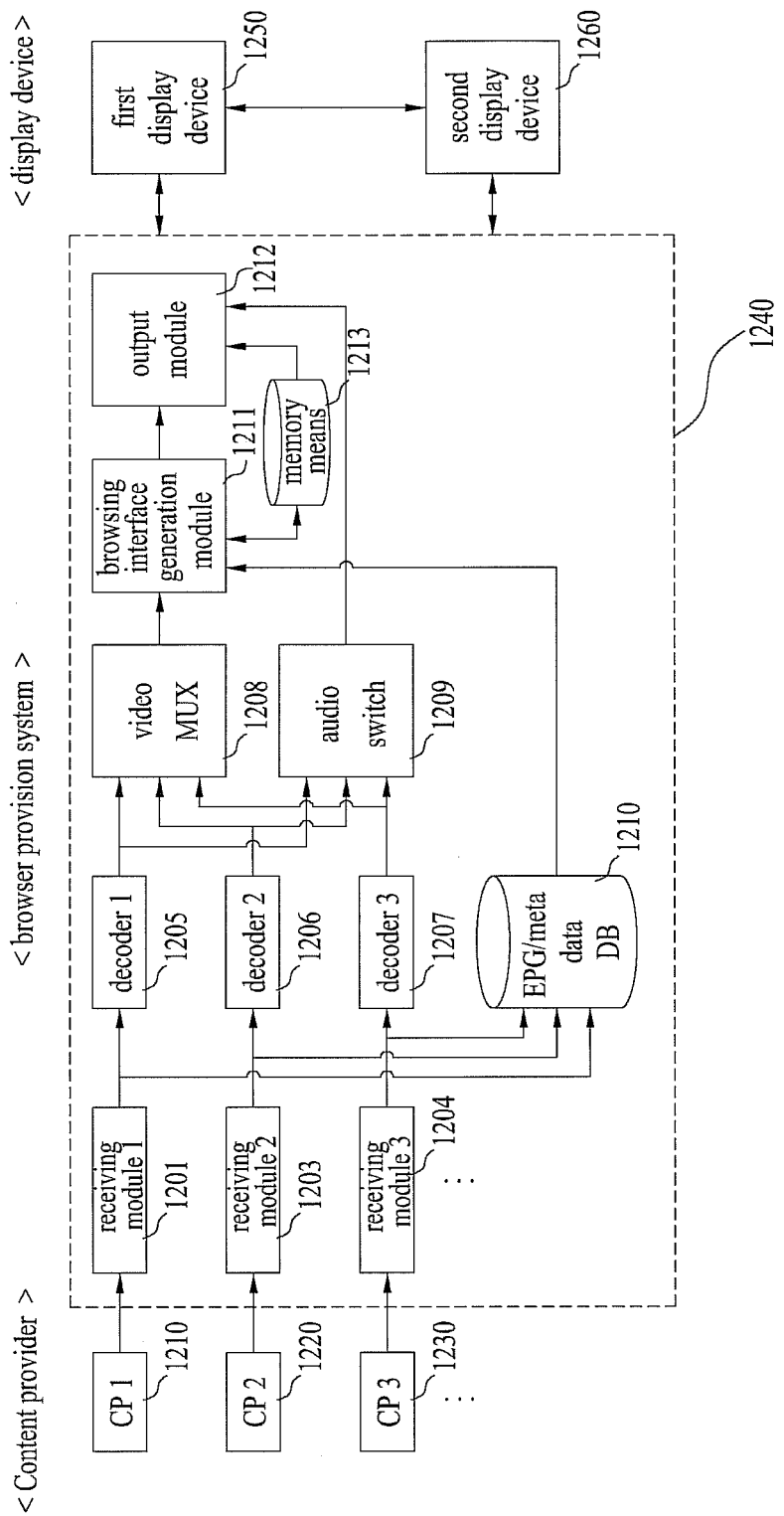
FIG. 6 is a diagram illustrating an example of a user interface provision system according to the present invention.

FIG. 6 is a diagram illustrating an example of a user interface provision system according to the present invention. Referring to FIG. 6, a plurality of content providers 1210, 1220 and 1230 transmit video signals to a browser provision system 1240.

The browser provision system 1240 receives the video signals received from the plurality of content providers through receiving modules 1201, 1203 and 1204. At this time, the receiving modules may be varied depending on types of the content providers, and the number of receiving modules may be determined depending on types of the video signals received from the content providers.

For example, if the content provider is the terrestrial broadcaster, the receiving module may include a tuner. If the content provider is the Internet broadcaster, the receiving module may include a network interface module.

The plurality of video signals received from the receiving modules 1201, 1203 and 1204 may be decoded by decoders 1205, 1206 and 1207 if necessary, and additional information, that is, EPG information or meta data, which is received from the receiving modules 1201, 1203 and 1204, may be processed by the data processor (not shown) and stored in an EPG/meta data database 1210.

A video MUX 1208 performs muxing for the video signals and then outputs the muxed video signals to a browsing interface generation module 1211, and the browsing interface generation module 1211 generates a browsing interface where the video signals are output on one screen.

At this time, if the user selects the video signal or the number of video signals as described above, the video MUX 1208 selects the video signal selected by the user or the number of video signals selected by the user.

Selection information on the video signal or the number of video signals may be provided from the first display device, and may directly be input to the browser provision system and then stored in a memory means 1213.

Also, the selected content provider or the information on the video signal or the number of video signals may be stored in the memory means 1213 per user.

The video MUX 1208 may perform muxing for the video signals in accordance with the selection information and output the muxed video signals to the browsing interface generation module 1211.

The browsing interface generation module 1211 generates the browsing interface by using the video signals received from the video MUX 1208.

At this time, the browsing interface may be configured by continuous pages, and the memory means 1213 may store content provider information of the video signals included per page.

Also, the browsing interface generation module 1211 determines the page of the browsing interface, which is being output to the first display device, and content provider information of the video signals included in the continuous pages, and then receives the video signal from the determined content provider to generate the browsing interface of the continuous pages, whereby the generated browsing interface may be loaded in the memory means 1213 or buffer (not shown). An output module 1212 outputs the browsing interface loaded in the memory means 1213 or butter to the first display device if a paging shifting command is received, whereby the output time of the browsing interface may be reduced.

The output module 1212 encodes the browsing interface and then outputs the encoded browsing interface to the first display device 1250.

The first display device 1250 outputs the browsing interface on the display screen. If one or more of the video signals included in the browsing interface are selected, the first display device 1250 determines the content provider of the selected video signals and then receives the video signals and outputs the received video signals on the display screen.

At this time, the first display device may receive content provider information per video signal and additional information (for example, EPG information or meta data) from the browser provision system.

In this case, the first display device 1250 or the second display device 1260 may include all the means that may output a browsing interface output from the browsing provision system. In this respect, the first display device 1250 or the second display device 1260 may include the digital broadcast receiver, the cellular phone terminal, the personal computer, etc. as described above, and the browser provision system 1240 may transmit and receive a signal to and from the first display device 1250 or the second display device 1260 through a random network. For example, the first display device 1250 or the second display device 1260 may be a cellular phone terminal that may be connected with the browser provision system 1240 through a wire or wireless base station, or may be a device that may be connected with the browser provision system 1240 through the Internet network. Also, the first display device 1250 may perform communication with the second display device 1260 through wire or wireless in accordance with the embodiment.

After determining the content provider of the selected video signal in accordance with the embodiment, the second display device 1260 may receive the video signal and output the received video signal on the display screen.

For example, if one or more of the video signals included in the browsing interface are selected by the user from the first display device, the first display device 1250 may transmit the video signal selection information to the browser provision system 1240, and the browser provision system 1240 may transmit the video signal selection information to the second display device 1260. Meanwhile, two embodiments may be considered to transmit a specific video signal based on the video signal selection information from the browser provision system 1240 to the first display device 1250 or the second display device 1260. First of all, the browser provision system 1240 may directly transmit the specific video signal to the corresponding display device. Also, CPs 1210, 1220 and 1230 may transmit the specific video signal to the corresponding display device. Moreover, if the video signal selection information is channel information, the first display device 1250 may be designed to directly transmit the channel information to the second display device 1260 without passing through the browser provision system 1240 within the scope of the present invention. At this time, the display devices 1250 and 1260 are connected to a communication network such as access point (AP) and Bluetooth.

For example, according to one embodiment, supposing that the first display device 1250 is a digital broadcast receiver and the second display device 1260 is a cellular phone terminal, if the user selects one or more of the video signals included in the browsing interface from the digital broadcast receiver 1250, the digital broadcast receiver 1250 may transmit the video signal selection information to the browser provision system 1240 through the wire or wireless network, and the browser provision system 1240 may transmit the selected video signal to the cellular phone terminal 1260 through the wire or wireless base station or wire or wireless network connection.

Also, the browser provision system 1240 may control the content provider, which provides the selected video signal, to transmit the selected video signal to the second display device, that is, the cellular phone terminal 1260.

Also, according to another embodiment, supposing that the first display device 1250 is a cellular phone terminal and the second display device 1260 is a digital broadcast receiver, if the user selects one or more of the video signals included in the browsing interface from the cellular phone terminal 1250, the cellular phone terminal 1260 may transmit the video signal selection information to the browser provision system 1240 through the wire or wireless network, and the browser provision system 1240 may transmit the selected video signal to the digital broadcast receiver 1260 through the wire or wireless network.

Also, if the user selects one or more of the video signals included in the browsing interface from the first display device 1250 and billing payment related to provision of the selected video signal is completed, the first display device 1250 may transmit the video signal selection information and payment information to the browser provision system 1240, and the browser provision system 1240 may transmit the video signal selection information and payment information to the second display device 1260.

The second display device 1260 may receive the video signal from the content provider by using the video signal selection information and payment information and output the received video signal on the display screen. At this time, billing payment related to reception of the selected video signal may not be performed by the second display device.

The first display device or the second display device according to the embodiment of the present invention may be selected from the user. Information on the first display device 1250 or the second display device 1260 selected by the user may be stored in the memory means 1213.

Of course, the first display device 1250 and the second display device 1260 may be configured by various combinations of devices (for example, digital broadcast receiver, cellular phone terminal, personal computer, etc.), which may be connected with the browser provision system through the wire or wireless network to transmit and receive data to and from the browser provision system, as described above.

As described above, a device, which outputs a full content corresponding to the selected video signal, may be designed to be set randomly by the user within the scope of the present invention. More detailed embodiment will be described with reference to FIG. 12 and FIG. 13.

Figure 7:
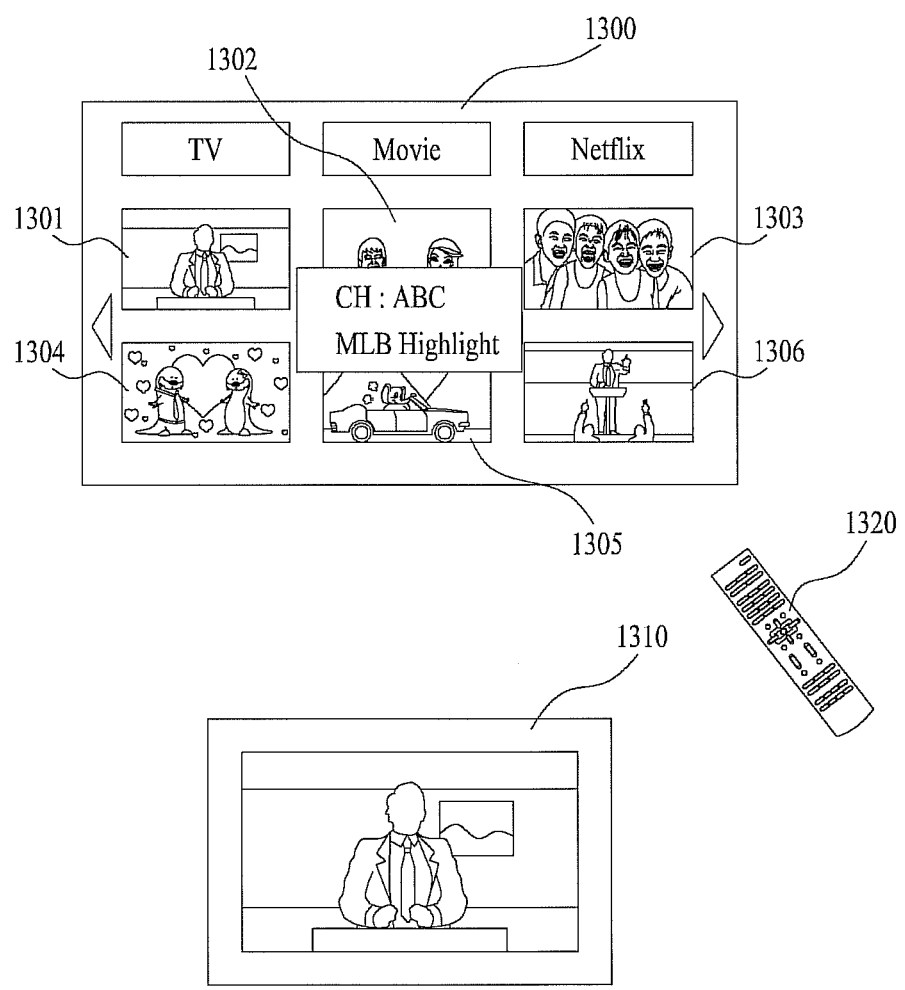
FIG. 7 is a diagram illustrating an example of a browsing interface according to one embodiment of the present invention.

FIG. 7 is a diagram illustrating an example of a browsing interface according to one embodiment of the present invention.

Referring to FIG. 7, a browsing interface 1300 which is generated by the browser provision system and provided to the first display device includes a plurality of video signals 1301, 1302, 1303, 1304, 1305 and 1306.

At this time, since the plurality of video signals are moving video signals not thumbnail images, the user may select one or more of the content provider or services provided by the content provider by using the plurality of video signals.

According to the embodiment, the browser provision system may configure a plurality of video signals as a browsing interface and transmit the browsing interface to the first display device in a streaming mode, and the first display device may receive the browsing interface transmitted in a streaming mode and output the received browsing interface.

Also, if the user selects one of the plurality of video signals by using a remote controller 1320 in accordance with the embodiment, the first display device may generate guide information by referring to EPG data or meta data of the selected video signal and then output the generated guide information on the display screen. At this time, EPG data or meta data corresponding to each video signal may be provided from the browser provision system as described above.

Next, if one or more of the video signals included in the browsing interface 1300 are selected, the first display device determines the content provider of the selected video signals and then receives the video signals and outputs the received video signals on the display screen.

For example, if the video signals selected by the user are terrestrial broadcasting, the first display device identifies content provider information and channel. Then, the first display device may control the tuner provided therein to receive a channel corresponding to the video signal and output the channel on the display screen like a reference numeral 1310.

In the meantime, if the user selects one or more of the video signals included in the browsing interface from the first display device in accordance with the embodiment as described above, the second display device may determine the content provider of the selected video signals and then receive the video signals and output the received signals on the display screen.

At this time, the first display device may transmit the video signal selection information to the browser provision system, and the browser provision system may transmit the video signal selection information to the second display device, as described above.

Also, if the user selects one or more of the video signals included in the browsing interface 1300 output from the first display device 1250 and billing payment related to provision of the selected video signal is completed, the first display device may transmit the video signal selection information and payment information to the browser provision system, and the browser provision system may transmit the video signal selection information and payment information to the second display device.

The second display device may receive the video signal from the content provider by using the video signal selection information and payment information and output the received video signal on the display screen like a reference numeral 1310. At this time, billing payment related to reception of the selected video signal may not be performed by the second display device.

The first display device or the second display device according to the embodiment of the present invention may be selected from the user.

Figure 8:
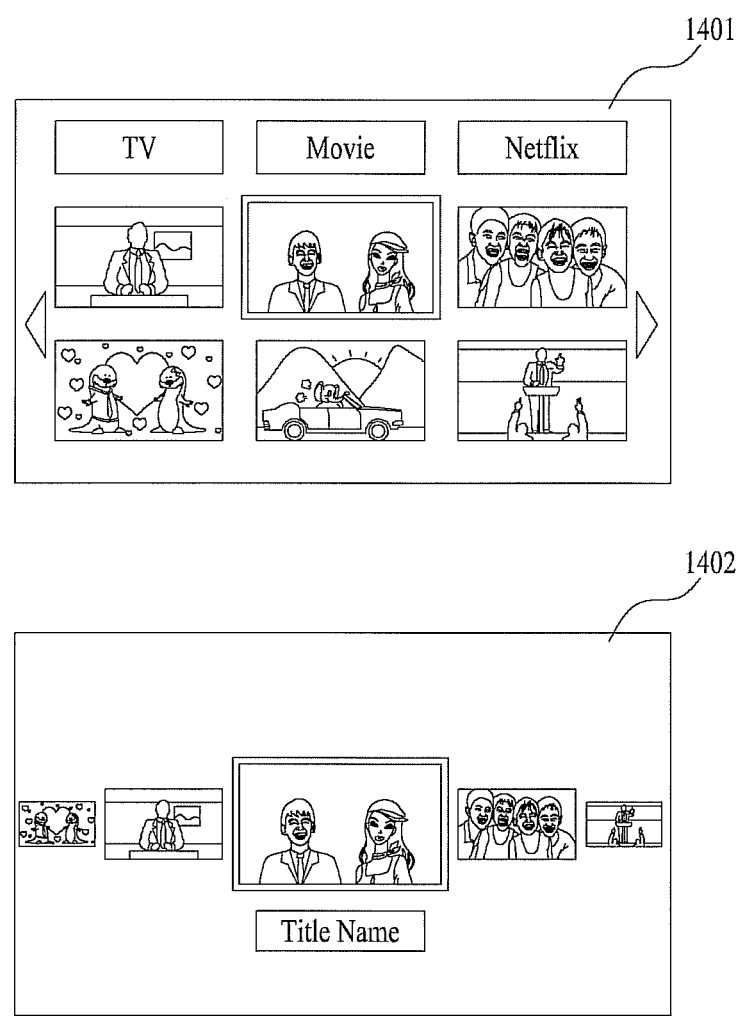
FIG. 8 is a diagram illustrating an example of a browsing interface according to the present invention.

FIG. 8 is a diagram illustrating an example of a browsing interface according to the present invention. Referring to FIG. 8, the browser provision system according to one embodiment of the present invention may configure a browsing interface which includes video signals selected by the user.

For example, the types of the video signals included in the browsing interface, or the content provider, which provides the video signals, may be selected from the user, and the number of the video signals included in the browsing interface may be selected from the user.

For example, the browsing interface may provide the video signals and a menu that may select the number of video signals, and the user may select the video signals output from the browsing interface or the number of video signals.

If the user selects the video signals or the number of video signals, the first display device provides the selected information to the browser provision system, and the browser provision system generates the browsing interface by muxing the video signal in accordance with the selected information and then outputs the generated browsing interface to the first display device.

For example, the browsing interface may include six video signals 1401 or five video signals 1402 in accordance with selection of the user.

Also, if the user selects the content provider in accordance with the embodiment, the browsing interface may be generated such that the video signals provided to the corresponding provider may be configured on one screen.

For example, if the user designates the content provider (or service) included in the browsing interface provided from the browser provision system as TV, Movie, Netflix, the browsing interface provision system configures the browsing interface by using a predetermined number of video signals provided from each content provider to output the browsing interface from the first display device.

Also, if the user designates the content provider (or service) included in the browsing interface provided from the browser provision system as TV, Movie, Netflix and designates the number of video signals provided from each content provider, the browsing interface provision system configures the browsing interface by using a designated number of video signals provided from each content provider to output the browsing interface from the first display device.

Figure 9:
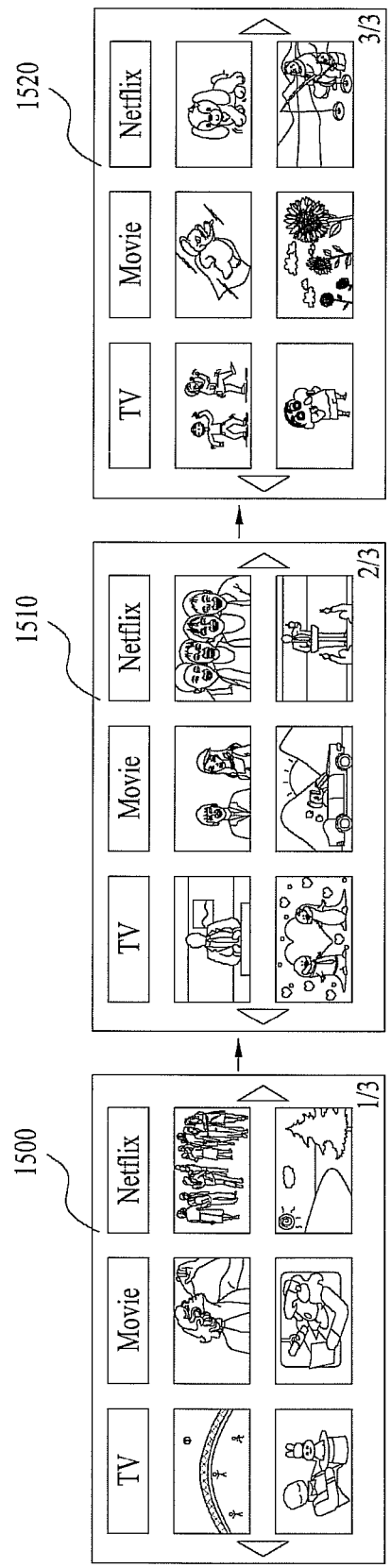
FIG. 9 is a diagram illustrating an example that a browsing interface according to the present invention is configured by continuous pages.

FIG. 9 is a diagram illustrating an example that a browsing interface according to the present invention is configured by continuous pages.

Referring to FIG. 9, the browsing interface according to the embodiment of the present invention may include continuous pages 1500, 1510, and 1520, and may store video signal information included per page in the memory means.

At this time, the browser provision system determines the content provider of the video signals included in the continuous pages 1500 and 1520 of the page 1510 of the browsing interface which is being output to the first display device, and then receives the video signals from the determined content provider, generates the browsing interface of the continuous pages and loads in the memory means (for example, buffer).

If the user selects page shifting from the first display device, the first display device transmits a page shifting command to the browser provision system. If the page shifting command is received, the browser provision system outputs the browsing interface loaded in the memory means to the first display device.

In the meantime, two embodiments may be considered to configure video signals output from each of the pages 1500, 1510 and 1520 shown in FIG. 9. According to the first embodiment, video signals existing at the same position in each page relate to the same content regardless of the pages. However, the video signals for first 10 seconds of the same content are output from the first page 1500, the video signals for next 10 seconds of the same content are output from the second page 1510, and the video signals for the last 10 seconds of the same content are output from the third page 1520.

Moreover, according to the second embodiment, video signals on different contents per page may be output. For example, the video signals corresponding to each of contents A, B, C, D, E, and F are output from the first page 1500, the video signals corresponding to each of contents G, H, I, J, K and L are output from the second page 1510, and the video signals corresponding to each of contents M, N, O, P, Q, and R are output from the third page 1520.

FIG. 10 is a diagram illustrating an example of a memory means of a browser provision system according to the present invention.

Referring to FIG. 10, the browser provision system according to one embodiment of the present invention may include content provider information 1602 of the video signals included in the browsing interface, first display device information 1603, second display device information 1604, and information 1605 on the number of video signals included in the browsing interface, in accordance with each user 1601. The first display device information 1603 corresponds to IP address, media access control (MAC) address, etc., and the second display device information 1604 corresponds to a cellular phone number, etc., for example.

If the user accesses the browser provision system by using the first display device in accordance with the embodiment, the browser provision system determines information on the user accessing the browser provision system, and then determines the video signals included in the browsing interface by using the content provider information 1602 and the information 1605 on the number of video signals included in the browsing interface. Also, the browser provision system may additionally store information on the video signals selected from the user per content provider with reference to the memory means.

Next, the browser provision system receives the video signals from the determined content provider, and then generates the browsing interface and outputs the generated browsing interface to the first display device.

The browser provision system may control the second display device to output the video signals selected from the browsing interface by using the second display device information 1604.

Figure 11:
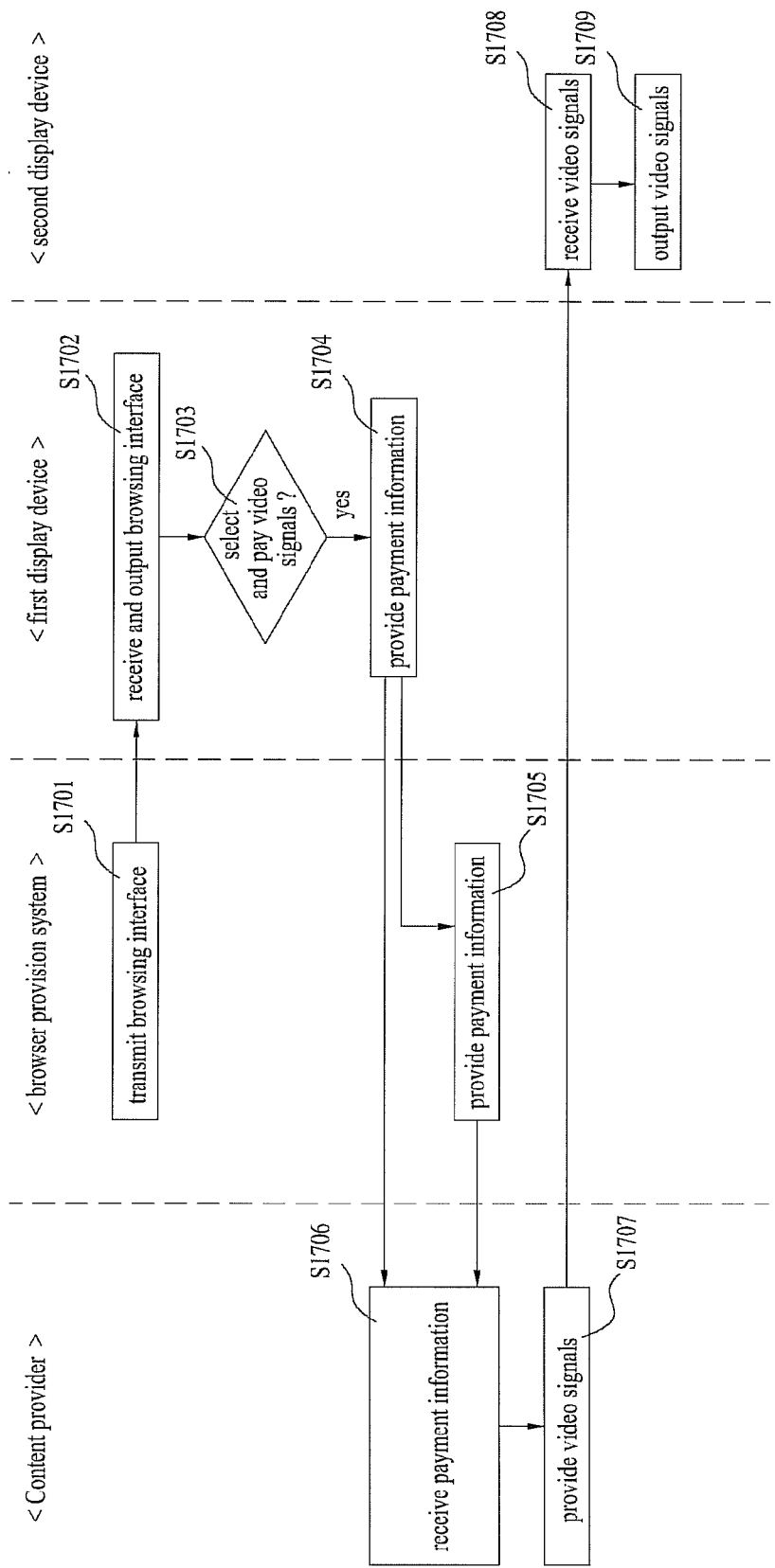
FIG. 11 is a flow chart illustrating a procedure of outputting a video signal from a second display device in accordance with other embodiment of the present invention.

FIG. 11 is a flow chart illustrating a procedure of outputting a video signal from a second display device in accordance with other embodiment of the present invention.

Referring to FIG. 11, the browser provision system according to one embodiment of the present invention transmits the generated browsing interface to the first display device at step S1701.

At step S1702, the first display device receives the browsing interface and outputs the received browsing interface to the display screen.

At step S1703, the first display device determines whether the video signals are selected and billed from the browsing interface. At this time, payment may be performed by implementation of an application related to payment at the first display device.

As a result of the step S1703, if it is determined that the video signals are selected and billed from the browsing interface, the first display device may provide information on the selected and billed video signals to the browser provision system at step S1704 or may transmit the information on the billed video signals to the content provider at step S1706. The browser provision system may provide the information on the selected and billed video signals to the content provider and the second display device at step S1705.

The content provider receives payment information on the video signals at step S1706, and then provides the video signals to the second display device at step S1707.

The second display device 1260 receives the video signals from the content provider at step S1708, and outputs the video signals on the display screen at step S1709.

The second display device may receive the video signals from the content provider by using the video signal selection information and payment information and output the received video signal on the display screen.

At this time, billing payment related to reception of the selected video signals may not be performed by the second display device.

The first display device or the second display device according to the embodiment of the present invention may be selected from the user, and may be configured by various combinations of devices (for example, digital broadcast receiver, cellular phone terminal, personal computer, etc.), which may be connected with the browser provision system through the wire or wireless network to transmit and receive data to and from the browser provision system, as described above. The first display device or the second display device selected by the user may be stored in the memory means.

Figure 12:
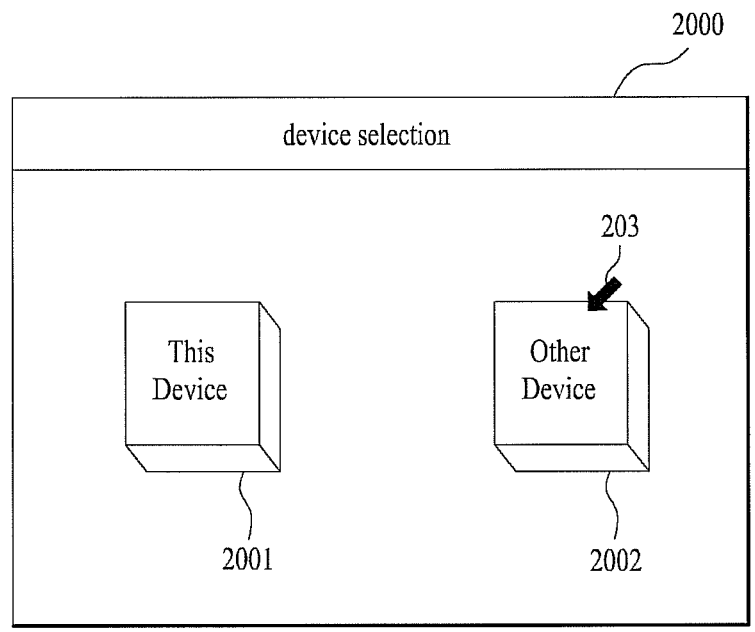
FIG. 12 is a diagram illustrating that types of devices, which may output contents selected by a browsing interface according to the present invention, are displayed.

FIG. 12 is a diagram illustrating that types of devices, which may output contents selected by a browsing interface according to the present invention, are displayed.

If a specific video signal is selected from the browsing interface according to the embodiment of the present invention as shown in FIG. 7 to FIG. 9, the first display device 2000 may display an OSD screen asking what device will output the full content corresponding to the selected video signal, as shown in FIG. 12.

The OSD screen includes an option 2001 selecting the first display device, and an option 2002 selecting the second display device. Accordingly, the user of the first display device 2000 may easily select a desired option by using an indicator 2003 controlled by the remote controller. In this case, it is advantageous in that the device, which outputs the browsing interface screen, may be set differently from the device, which outputs the full content.

Of course, the user interface, which selects the device as shown in FIG. 12, may not be provided, and the full content may be displayed through the device, which provides the browsing interface as default, within the scope of the present invention.

Figure 13:
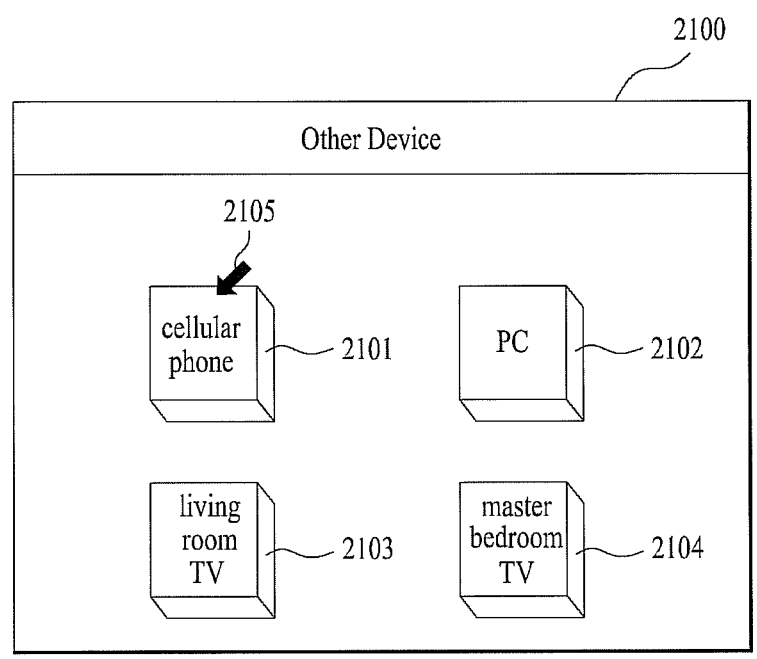
FIG. 13 is a diagram illustrating that a list of other device selected in FIG. 12 is displayed.

FIG. 13 is a diagram illustrating that a list of other device selected in FIG. 12 is displayed. If the other device shown in FIG. 12 is selected, it is designed to output the list shown in FIG. 13.

The user may set a plurality of devices, which output the full content, if necessary. In this case, the first display device 2100 displays lists 2101, 2102, 2103 and 2104 of at least one or more second display devices from which the full content may be output. As described above, the user of the first display device 2100 may easily select a desired specific second display device by using an indicator 2105 controlled by the remote controller.

Accordingly, if the user interface described in FIG. 12 or FIG. 13 is used, the present invention is advantageous in that the other device from which the full content is output may be selected more easily and quickly.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

MODE FOR CARRYING OUT THE INVENTION

As described above, related matters have been described in the best mode for carrying out the present invention.

INDUSTRIAL APPLICABILITY

As described above, the embodiments of the present invention may be applied to a broadcast system, a display device, a TV, a mobile device, etc.

The invention claimed is:

1. A method for controlling a server, the method comprising:
receiving a plurality of video signals from specific content providers selected from among a plurality of content providers through a receiving module, the video signals corresponding to moving thumbnail image data;
decoding the received video signals through a decoder;
muxing the decoded video signals through a multiplexer;
generating a browsing interface, which outputs the muxed video signals on one screen, through a browsing interface generation module, the browsing interface being comprised of continuous pages and each of the continuous pages is configured by using the received video signals from the specific content providers;
encoding the generated browsing interface through an encoder; and
transmitting the encoded browsing interface to an external display device, the external display device being connected with the server through a short-range communication network, a mobile communication network or an internet network.

2. The method according to claim 1, further comprising storing at least one or more of ID of a content provider per user in the external display device, the number of the video signals, and identification information of the second display device in the memory.

3. The method according to claim 2, wherein the second display device corresponds to an external device that receives and outputs full contents corresponding to the video signals.

4. The method according to claim 1, wherein the video signal included in the browsing interface of the first page corresponds to a first time domain of the first full content, the video signal included in the browsing interface of the second page corresponds to a second time domain of the first full content, and the second time domain is set different from the first time domain.

5. The method according to claim 1, wherein the video signal included in the browsing interface of the first page is related to the first full content, the video signal included in the browsing interface of the second page is related to the second full content, and the second full content is set different from the first full content.

6. The method according to claim 1, further comprising:
determining a content provider information of the video signals included in continuous pages of a page of the browsing interface;
generating a browsing interface of the continuous pages by receiving the video signals from the determined content provider; and
storing the browsing interface of the generated continuous pages.

7. The method according to claim 6, wherein storing the browsing interface includes loading the browsing interface in a buffer.

8. A method for providing a user interface, the method comprising:
receiving a plurality of video signals from specific content providers selected from among a plurality of content providers;
muxing the video signals;
generating a browsing interface where the video signals are output from one screen;
encoding the generated browsing interface and outputting the encoded browsing interface to a first display device;
displaying the browsing interface on a display screen through the first display device, the browsing interface being comprised of continuous pages and each of the continuous pages is configured by using the received video signals from the specific content providers;
displaying an option listing a device that may output full contents corresponding to the video signals; and
when a video signal selected by the browsing interface includes channel information, transmitting the channel information from the first display device to a second display device through a short-range communication network, a mobile communication network or an internet network, the second display device corresponding to a device selected at the option.

9. The method according to claim 8, when one or more of the video signals included in the browsing interface are selected, the method further comprising:
determining the selected video signals through the first display device;
receiving full contents corresponding to the video signals; and
displaying the received full contents.

10. A server comprising:
a receiving module receiving a plurality of video signals from specific content providers selected from among a plurality of content providers, the video signals corresponding to moving thumbnail image data;
a decoder decoding the received video signals;
a multiplexer muxing the decoded video signals;
a browsing interface generating module generating a browsing interface, which outputs the muxed video signals on one screen, the browsing interface being comprised of continuous pages and each of the continuous pages is configured by using the received video signals from the specific content providers;
an encoder encoding the generated browsing interface; and
a transmitting module transmitting the encoded browsing interface to an external display device through a short-range communication network, a mobile communication network or an internet network.

11. The server according to claim 10, further comprising a memory storing at least one or more of ID of a content provider per user in the display device, the number of the video signals, and identification information of the second display device.

12. The server according to claim 11, wherein the second display device corresponds to an external device that receives and outputs full contents corresponding to the video signals.

13. The server according to claim 10, wherein the video signal included in the browsing interface of the first page corresponds to a first time domain of the first full content, the video signal included in the browsing interface of the second page corresponds to a second time domain of the first full content, and the second time domain is set different from the first time domain.

14. The server according to claim 10, wherein the video signal included in the browsing interface of the first page is related to the first full content, the video signal included in the browsing interface of the second page is related to the second full content, and the second full content is set different from the first full content.

15. A system comprising:
a server receiving a plurality of video signals from specific content providers selected from among a plurality of content providers, muxing the video signals, generating a browsing interface where the video signals are output from one screen, encoding the generated browsing interface and outputting the encoded browsing interface to a display device, wherein the browsing interface being comprised of continuous pages and each of the continuous pages is configured by using the received video signals from the specific content providers; and
the display device displaying the browsing interface received from the server on a display screen and displaying an option listing a device, which may output full contents corresponding to the selected video signals,
wherein the display device is connected with the server through a short-range communication network, a mobile communication network or an internet network.

* * * * *